(No Model.)

L. MATTHEWS.
CORN SHELLER.

No. 294,488. Patented Mar. 4, 1884.

WITNESSES:
Donn Twitchell
C. Sedgwick

INVENTOR:
L. Matthews
BY Munn & Co
ATTORNEYS.

UNITED STATES PATENT OFFICE.

LUTHER MATTHEWS, OF PARIS, TEXAS.

CORN-SHELLER.

SPECIFICATION forming part of Letters Patent No. 294,488, dated March 4, 1884.

Application filed August 7, 1883. (No model.)

*To all whom it may concern:*

Be it known that I, LUTHER MATTHEWS, of Paris, in the county of Lamar and State of Texas, have invented a new and useful Improvement in Corn-Shellers, of which the following is a full, clear, and exact description.

This invention relates to that description of corn-shellers which consists of a fixed shelling-plate or bed-piece having a suitable shelling upper surface, over or against which the ear of corn is rubbed by hand to shell it.

The invention comprises a double-shelling surface of peculiar construction in one plate or bed-piece, whereby a corn-sheller having but little weight is produced, which shall be capable of shelling either one ear of corn, or, by using both hands, two ears of corn at the same time, and which shall do its work with increased ease, ready clearance for the shelled corn, and protection, when using both hands, against their striking each other, substantially as hereinafter described.

Reference is to be had to the accompanying drawings, forming part of this specification, in which similar letters of reference indicate corresponding parts in both the figures.

Figure 1:
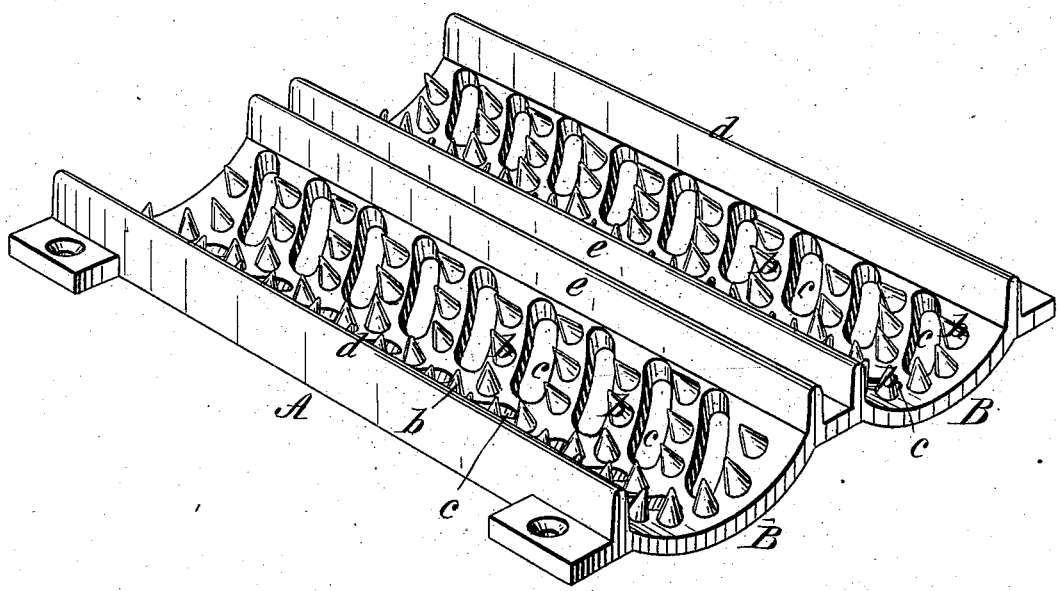
Figure 2:
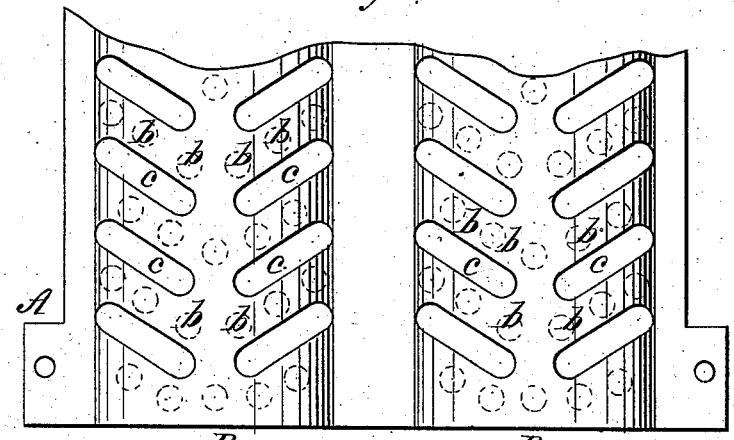

Figure 1 represents a view in perspective of a corn-shelling plate or bed-piece embodying my invention; and Fig. 2 an inverted plan or back view of the same, part being broken away.

A is a cast-metal corn-shelling plate or bed-piece, which may be secured by screws or otherwise to any suitable bench or table, and which is constructed with duplicate and parallel shelling-concaves B B, arranged to extend throughout the length of the plate. These concaves are armed on their upper surfaces or faces with isolated sharp or pointed teeth $b\ b$, arranged in rows on either side of each concave, converging toward one another, and between these rows are similarly-converging or reversely-inclining clearance-openings $c\ c$ for the corn as it is shelled, to automatically rid the device of the shelled corn. The isolated teeth $b\ b$ enable the corn to be shelled with much greater ease than is practicable with blunt ridges. The mode of operation, however, is the same—that is, the ears of corn are rubbed by the hands over the teeth in the concaves. The plate A has not only outer raised side ribs or guides, $d\ d$, but also intermediate longitudinal ribs or guides $e\ e$, between the two concaves B B, to form a protector for the hands and prevent them from striking one another when using both hands to shell two ears of corn at the same time—that is, one ear in each concave—and whereby twice the amount of corn may be shelled in a given period that a single-concave sheller could effect.

This double sheller may be used with the same facility for shelling a single ear of corn at a time by using only one of its concaves as a single sheller, and the use of the two concaves may be alternated with advantage.

Having thus described my invention, I claim as new and desire to secure by Letters Patent—

1. A corn-shelling plate or bed-piece having duplicate shelling-concaves B B, arranged side by side, with a longitudinal protector, $e\ e$, for the hands between them, substantially as specified.

2. A corn-shelling plate or bed-piece constructed with duplicate shelling-concaves B B, having a longitudinal protector, $e\ e$, for the hands between them, isolated shelling-teeth on their upper surfaces, and clearance-openings in or through them for the shelled corn, essentially as specified.

3. The combination, in a stationary corn-shelling plate or bed-piece, of the duplicate shelling-concaves B B, arranged side by side, and having opposite side rows of reversely-inclined clearance-openings $c\ c$ in them, the isolated teeth $b\ b$, arranged in similarly-inclined rows between said openings, and the longitudinal protector $e\ e$, for the hands of the operator, between the concaves, substantially as shown and described.

LUTHER MATTHEWS.

Witnesses:
WM. H. HILL,
F. J. G. ZETHRAEUS.